United States Patent [19]

Inokuchi

[11] Patent Number: 4,899,785
[45] Date of Patent: Feb. 13, 1990

[54] PROPORTIONAL PRESSURE REDUCING VALVE

[75] Inventor: Iwane Inokuchi, Kanagawa, Japan

[73] Assignee: Nissan Motor Co., Ltd., Yokohama, Japan

[21] Appl. No.: 254,896

[22] Filed: Oct. 7, 1988

[30] Foreign Application Priority Data

Oct. 8, 1987 [JP] Japan .......................... 62-154302[U]

[51] Int. Cl.$^4$ .......................................... F15B 13/044
[52] U.S. Cl. ................................ 137/625.65; 91/419; 91/433; 91/468; 192/109 F
[58] Field of Search .................. 91/419, 433; 137/468, 137/625.65; 192/109 F

[56] References Cited

U.S. PATENT DOCUMENTS 4,250,922  2/1981  Will et al. ........................ 137/625.65
4,316,599  2/1982  Bouvet et al. ................... 137/625.65

FOREIGN PATENT DOCUMENTS 60-142371  9/1985  Japan .
61-139369  8/1986  Japan .

*Primary Examiner*—Gerald A. Michalsky
*Attorney, Agent, or Firm*—Foley & Lardner, Schwartz, Jeffery, Schwaab, Mack, Blumenthal & Evans

[57] ABSTRACT

In a proportional pressure reducing valve including a spool having a first end connected to a solenoid and a second end exposed to a feedback chamber, and formed with a groove for allowing a supply port to communicate with an output port when the spool is driven by the solenoid in proportional to solenoid current under balanced condition of an axial force of the solenoid and feedback pressure, the pressure reducing valve further comprises a valve for allowing the feedback chamber to communicate with a drain port to control the valve into inbalanced condition to momentarily raise output port pressure up to supply pressure, when the hydraulic output pressure within the feedback chamber rises beyond a predetermined relief pressure.

9 Claims, 12 Drawing Sheets

PROPORTIONAL PRESSURE REDUCING VALVE

BACKGROUND OF THE INVENTION

1. Field of the Invention

The present invention relates to a proportional pressure reducing valve, and more specifically to a direct acting proportional pressure reducing valve used for controlling a clutch assembly incorporated in an automatic transmission for an automotive vehicle, for instance.

2. Description of the Prior Art

An example of proportional pressure reducing valves is disclosed in Japanese Published Unexamined (Kokai) Utility Model Application No. 60-142371. In this prior-art proportional pressure reducing valve, a proportional solenoid composed of a coil, a plunger, and a push rod is provided at an end of a spool slidably disposed within a central hole formed in a valve housing, and an output port pressure of the valve is controlled by the spool under balanced condition of an axial force generated by the solenoid and applied to one end of the spool and an output port pressure introduced into a feedback chamber and applied to the other end of the spool. This output port pressure is introduced into a clutch assembly for an automatic transmission for an automotive vehicle to control clutch engagement operation.

When the above-mentioned valve is used to control clutch assembly of the automatic transmission, a high control precision and a high pressure response speed are both required for the valve to improve transmission (speed change) feeling or reduce transmission (speed change) shock.

In more detail, the precision of the clutch pressure control operation is closely related to transmission shock. That is, to reduce transmission shock, it is necessary to first keep the clutch under half engagement condition and then under perfect engagement condition by controlling the hydraulic pressure, after a sufficient rotary force has been transmitted. In order words, in case the precision of the clutch pressure control is not high, the half clutch engagement is not obtained, so that a great transmission shock is generated.

On the other hand, the clutch response speed is determined by a delay time from when a clutch assembly piston begins to move in response to an output pressure of the proportional pressure reducing valve to when clutch disks are engaged with each other to transmit a rotary force. Therefore, it is important to reduce the above-mentioned delay or wasteful time. This delay time is dependent upon pressure loss in the valve and piping system. Therefore, there inevitably exists a lower limit of the opening area of the spool valve in order to reduce pressure loss of the valve.

In the case of a cylindrical port, the opening area S can be expressed as $$S = \pi \cdot D \cdot l \quad (1)$$

where D denotes the spool diameter, and l denotes a spool opening length. Further, an axial force F required for the proportional solenoid can be expressed as $$F = \tfrac{1}{4} \cdot \pi D^2 \cdot P \quad (2)$$

where P denotes output port pressure of the pressure reducing valve.

Therefore, in order to reduce the delay time and to improve the response speed, the opening area must be increased, and therefore it is necessary to increase the opening length l or the spool diameter D. However, when the opening length l is increased, it is necessary to increase the effective stroke of the proportional solenoid, so that there exists a problem in that the solenoid dimensions increase On the other hand, when the spool diameter is increased, it is necessary to increase the axial force F of the proportional solenoid, so that there exist other problems in that the solenoid dimensions increase and further the solenoid current consumption rate increases. On the other hand, when the proportional solenoid dimensions are restricted, the controllable pressure range may be narrowed.

In summary, in the prior-art valve, the controllable pressure range is inevitably narrowed, when the size and the current consumption of the proportional solenoid are reduced under consideration of mounting space and heat generation, thus resulting in a problem in that the clutch easily slides when the clutch pressure is low and the clutch torque is high. Therefore, the response speed and the controllable pressure range are determined by finding an appropriate point of compromise.

To overcome the above-mentioned problem, other structures such that a two-step spool having the feedback portion whose diameter is smaller than that of the port portion or valves of pilot type have been proposed. In the case of the two-step spool, however, the concentricity of the two different diameter portions must be precise and therefore the manufacturing cost is high. Further, since the spool driving force is small, there exists another problem in that the valve is subjected to external disturbance such as friction or hydraulic pressure.

On the other hand, in the case of the pilot valve, the structure is complicated; the manufacturing cost is high; the size is large, so that there are many factors related to delay time and therefore the response speed is low.

SUMMARY OF THE INVENTION

With these problems in mind, therefore, it is the primary object of the present invention to provide a proportional pressure reducing valve which is high in control precision and response speed and large in controllable pressure range without increasing the size and the current consumption of the proportional solenoid.

To achieve the above-mentioned object, a proportional pressure reducing valve according to the present invention comprises: (a) a valve housing formed with a supply port, an output port, a drain port, and a first feedback chamber communicating with the output port; (b) a proportional solenoid attached to said valve housing; (c) a spool having a first end connected to said solenoid and a second end exposed to the feedback chamber, said spool formed with a groove for allowing the supply port to communicate with the output port, when said spool is driven by said proportional solenoid in such a way that output pressure at the output port increases in proportion to current passed through said solenoid under balanced conditions of an axial force applied to the first end of said spool by said proportional solenoid and a feedback force applied to the second end of said spool within the feedback chamber; and (d) valve means for allowing the feedback chamber to communicate with the drain port to control said spool into inbalanced condition, when output pressure at the output port exceeds a predetermined value, to sharply raise output port pressure.

The valve means is a relief valve including a valve ball and a spring, an open/close valve including a valve piston, and a pressure reduction valve, each for relieving hydraulic pressure within the feedback chamber to the drain port, when output port pressure rises beyond a predetermined pressure, to momentarily or sharply increase the output port pressure up to the supply pressure.

Where the valve of the present invention is applied to control a clutch assembly for an automatic transmission, if the solenoid current is equal to or lower than a predetermined relief current, since hydraulic output pressure increases in proportion to the solenoid current, it is possible to gradually engage the clutch under half clutch engagement conditions. On the other hand after an sufficient rotary force has been transmitted, if the solenoid current increases more than the relief current, since the hydraulic output pressure increases sharply up to the supply pressure, it is possible to completely engage the clutch under stable clutch engagement conditions.

Further, it is preferable to use a temperature sensitive relief valve for the valve means to relieve hydraulic pressure within the feedback chamber to the drain port at low temperature (e.g. −20° to −30° C.) irrespective of the output port pressure.

DETAILED DESCRIPTION OF THE PREFERRED EMBODIMENTS

A first embodiment of the proportional pressure reducing valve of the present invention will be described with reference to FIGS. 1(A), (B) and (C) In FIG. 1(A), the valve 1 is roughly composed of a proportional solenoid section 2 and a valve section 3. The proportional solenoid portion 2 includes a coil 4, a plunger 5, and a push rod 6.

The valve section 3 includes a valve housing 8 formed. with an insertion through hole 9 at the center thereof This insertion through hole 9 communicates with a supply port 10 connected to a hydraulic pressure source 13, a drain port 11 connected to a tank 14, and an output port 12 connected to a clutch assembly 16 via a pipe 15.

A spool 17 is slidably disposed within the insertion through hole 9. One end surface of the spool 17 (on the right side) is in contact with a push rod 6 of the solenoid section 2. The spool 17 is formed with a first land portion 18 facing the supply port 10, a second land portion 19 facing the drain port 11, and a groove portion 20 facing the output port 12 formed between the two ports 10 and 11.

The other end of the spool 17 (on the left side) communicates with a feedback chamber 23 communicating with the output port 12 via a feedback path 21 and a damping throttle 22. Further, the spool 17 is urged toward the solenoid section 2 by a return spring 24 disposed within this feedback chamber 23. Further, the feedback chamber 23 communicates with the drain port 11 via a throttle 25 and a path 26. A relief valve 29 composed of a spring 27 and a ball 28 is provided at this throttle 25.

The clutch assembly 16 includes a first rotary body 31, and a second rotary body 32 rotatable relative to the first rotary body 31. First clutch discs 33 are slidably spline-fitted to the first rotary body 31 so as to be rotatable therewith, and a second clutch disc 34 is also slidably spline-fitted to the second rotary body 32 so as to be rotatable therewith. These two clutch discs 33 and 34 are alternately disposed A piston 35 is slidably disposed within the first rotary body 31, and urged by a return spring 36. Further, the rotary body 31 is formed with a stopper 37.

The operation of the first embodiment thereof will be described hereinbelow.

When current flows through the coil 4 of the proportional solenoid section 2, an attraction force proportional to the current is produced at the plunger 5 to urge the spool 17 via the push rod 6 in the leftward direction. Therefore, the supply port 10 communicates with the output port 12 via the groove portion 20, so that output pressure at the output port 12 rises. The pressure at this output port 12 is introduced into the feedback chamber 23 via the feedback path 21 and therefore pressure within the feedback chamber 23 rises to move the spool in the rightward direction. That is, the spool 7 is balanced at a position where an axial force generated by the solenoid and applied to the rightward end of the spool 7 and a force obtained by the pressure within the feedback chamber 23 and applied to the left end of the spool 7.

FIG. 1(B) shows the relationship between the solenoid current I and the valve output pressure P. In FIG. 1(B), the output pressure P increases in proportion to an increase in the solenoid current I. However, when the current reaches a relief current $I_r$, the pressure within the feedback chamber 23 reaches a relief pressure $P_r$ determined by the spring 27 of the relief valve 29 at the throttle 25, so that the pressure $P_r$ within the feedback chamber 23 is released into the tank 14 via the drain port 11. In other words, when the solenoid current increases beyond this predetermined relief current value $I_r$, since the pressure within the feedback chamber 23 is released, the spool is not balanced, because the axial force of the solenoid exceeds the pressure force within the feedback chamber, so that the spool 7 is moved in the leftward direction. Therefore, the supply port 10 is full opened and therefore the output pressure reaches a supply pressure $P_s$ of the hydraulic pressure source 13. In the above operation, the elastic force of the return spring 24 is weak enough to full close the supply port 10 and the drain port 11 when no current is supplied to the coil 4, this return spring 24 will not exert a harmful influence upon the above operation.

In the prior-art valve, the current I is increased to an upper limit $I_{max}$ to which current can be passed under consideration of the coil resistance, power supply voltage, heat generation, etc., so that an output pressure P proportional to the current I can be obtained up to the maximum pressure $P_{max}$, as shown in FIG. 1(B).

In contrast with this, when the proportional pressure reduction valve 1 of the present invention provided with such solenoid current-output pressure characteristics as shown in FIG. 1(B) is used to control the pressure supplied to the clutch assembly 16, the solenoid current is determined below the predetermined relief current $I_r$ and the output pressure is determined below the relief pressure $P_r$. This output pressure is introduced into the clutch assembly 16 via the pipe 15, to urge the piston 35 in the leftward direction against the return spring 36, so that the piston 35 engages two axially slidable clutch disks 33 and 34 into half engagement conditions by precisely controlling the clutch pressure Thereafter, when the solenoid current is increased beyond this relief current $I_r$ corresponding to a relief pressure, since the pressure rises sharply to the supply pressure $P_s$, the piston 35 urges the clutch discs 33 and 34 into contact with the stopper 37 into tight clutch engagement conditions. Since these clutch discs 33 and 34 are fixed to the first and second rotary bodies 31 and 32, respectively by splines in the rotary direction, a rotational force is transmitted from the first rotary body 31 to the second rotary body 32 or vice versa.

In the embodiment, since the clutch engagement pressure is equal to the supply pressure, it is possible to obtain a sufficient tight engagement pressure between the two clutch disks 33 and 34 without sliding motion thereof by increasing the solenoid current to a value a little above the predetermined relief current $I_r$, thus saving the power consumption.

When the current is decreased from the tight clutch engagement condition down to the relief current $I_r$, since the pressure within the feedback chamber 23 is high, the spool 17 moves in the rightward direction, so that the supply port 10 is closed; the drain port 11 is opened; the pressure within the output port 12 drops; and therefore the pressure within the feedback chamber 23 drops. When the pressure within the feedback chamber 23 drops below the relief pressure $P_r$, since the ball 28 is urged to the throttle 25 by the return spring 27, the output pressure decreases in proportion to the solenoid current below the relief current $I_r$.

FIG. 1(C) shows a modification of the first embodiment, in which the relationship between the solenoid current and the output pressure is modified.

When a pressure $P_b$ determined by an expression as $$P_b = \frac{R_f + R_r}{R_r} \times P_r \qquad (3)$$

is lower than the supply pressure $P_s$, where $R_f$ denotes the hydraulic resistance of the feedback path 21 and the throttle 22 and $R_r$ denotes the hydraulic resistance of the relief valve 29 and the throttle 25, it is possible to modify the current-output pressure characteristics as shown in FIG. 1(C). In FIG. 1(C), when the current reaches the predetermined relief current $I_r$, the output pressure changes momentarily from the relief pressure $P_r$ to the pressure $P_b$, and the output pressure increases up to the supply pressure in proportion to an increase in solenoid current when the current increases beyond the predetermined relief current $I_r$.

Figure 1A:
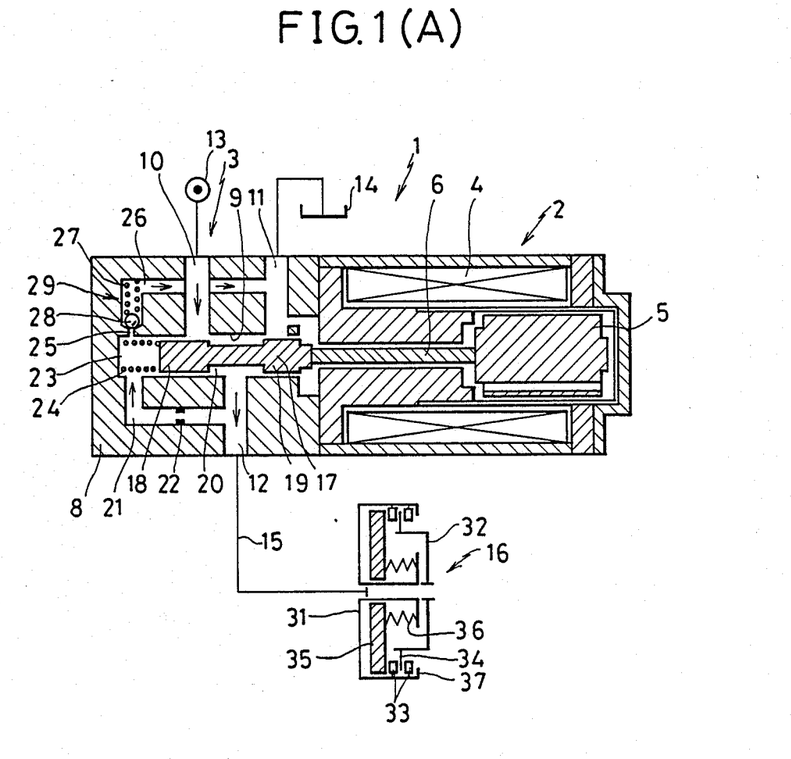
FIG. 1(A) is a cross-sectional view showing a first embodiment of the proportional pressure reducing valve of the present invention.
Figure 1B:
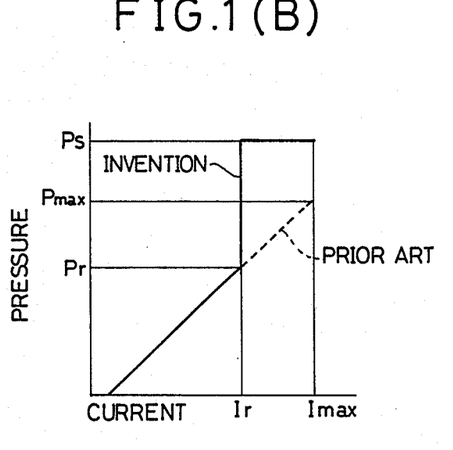
FIG. 1(B) is a graphical representation showing solenoid current-output pressure characteristics of the first embodiment shown in FIG. 1(A)
Figure 1C:
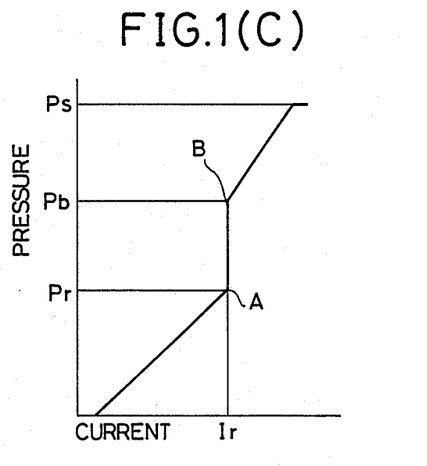
FIG. 1(C) is a similar graphical representation showing other solenoid current-output pressure characteristics of the first embodiment, in which a preset relief pressure is changed.

Further, in FIG. 1(A), since the relief valve 29 is disposed on the upper side of the proportional pressure reducing valve 1 when installed in position, it is possible to vent air within the feedback chamber 23 to stabilize the pressure control operation of the valve.

Figure 2A:
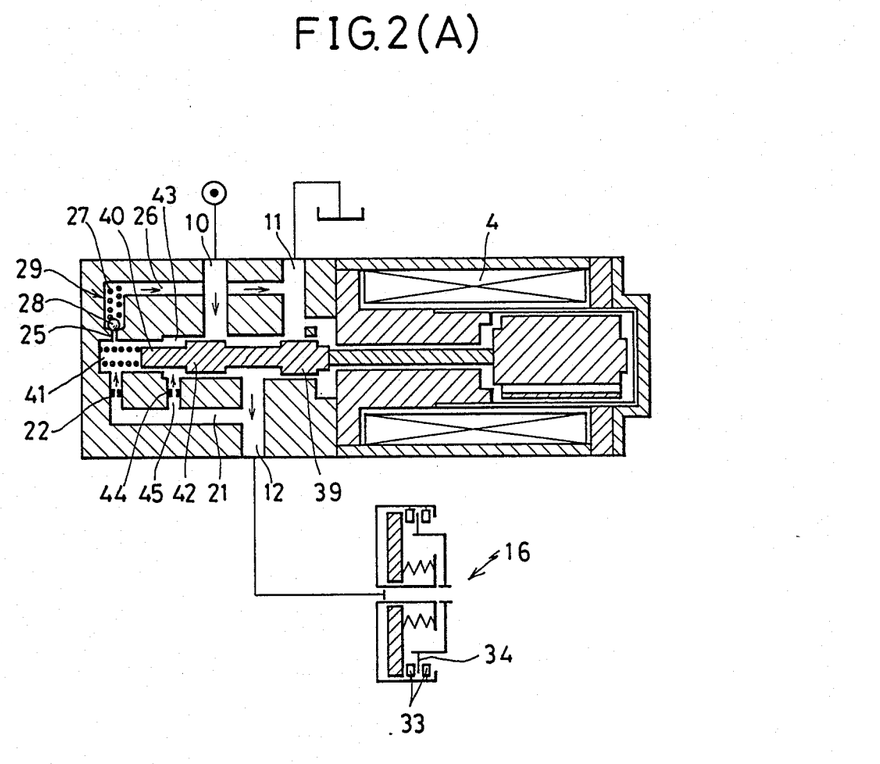
FIG. 2(A) is a cross-sectional view showing a second embodiment of the proportional pressure reducing valve of the present invention.

FIG. 2(A) shows a second embodiment of the present invention, in which the same reference numerals have been retained for the similar parts which have the same functions, without repeating the description thereof.

In FIG. 2(A), the spool 39 is formed with a small diameter portion 40 at the leftward end thereof Further, the feedback chamber is divided into a first feedback chamber 41 formed on the left end portion of a small diameter portion 40 and a second feedback chamber 43 formed by the small diameter portion 40, an inner circumferential wall near the supply port 10, and the shoulder portion of the land portion 42 facing the supply port 10. This second feedback chamber 43 communicates with the output port 12 via a throttle 44 and a path 45 and the feedback path 21. Further, in the same way as in the first embodiment, the first feedback chamber 41 communicates with the output port 12 via the throttle 22 and the path 21 and the drain port 11 via the throttle 25 and the path 26 Further, the relief valve 29 is composed of the return spring 27, the ball 28 and the throttle 25. The structural features and functional effects of this second embodiment other than those described above are substantially the same as with the first embodiment The operation of the second embodiment will be described hereinbelow with reference to FIG. 2(B), in which the relationship between the solenoid current and the output pressure is shown.

Figure 2B:
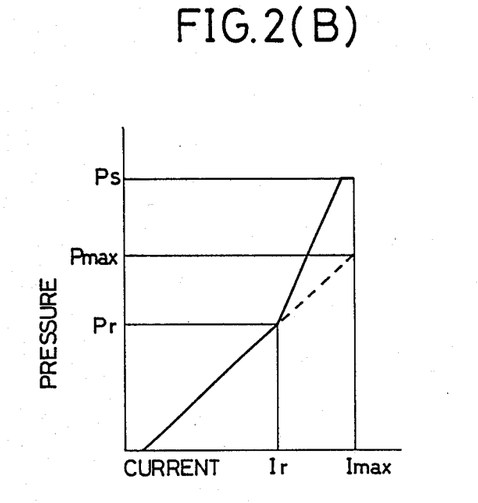
FIG. 2(B) is a graphical representation showing solenoid current-output pressure characteristics of the second embodiment shown in FIG. 2(A)

In FIG. 2(B), when the solenoid current I is equal to or lower than a predetermined relief current valve $I_r$ corresponding to the relief pressure $P_r$, the operation is quite the same as in the first embodiment.

Here, where $A_1$ denotes a pressure receiving area of the small diameter portion 40 of the spool 39 within the first feedback chamber 41; $A_2$ denotes a pressure receiving area within the second feedback chamber 43, since the total pressure receiving area is $(A_1+A_2)$, an axial force F of the proportional solenoid section 2 required for balanced condition can be expressed as $$F = P(A_1 + A_2) \quad (4)$$

where P denotes an output pressure or a feedback pressure.

Further, when the output pressure P is higher than the relief pressure $P_r$, since the pressure within the first feedback chamber 41 is kept roughly at the relief pressure $P_r$, the following expression can be obtained $$F = P_r A_1 + PA_2 \quad (5)$$

Here, since an axial force F of the proportional solenoid section 2 is proportional to the current I passed through the coil 4, the gradient (the rate of change) of the output pressure P with respect to the current I above the relief pressure $P_r$ is larger than that below the same relief pressure $P_r$, so that the output pressure P reaches the supply pressure $P_s$ before the current I reaches the maximum current $I_{max}$, as depicted in FIG. 2B. Further, in FIG. 2(B), the dashed line indicates the prior-art characteristics.

When the clutch pressure is controlled, the two clutch disks 33 and 34 are engaged into a half clutch condition below the relief pressure $P_r$ to gradually transmit a rotary force. Under these conditions, since a feedback pressure is applied to both the first and second feedback chambers 41 and 43, the spool 39 can be held stably, without being subjected to external disturbance such as friction, hydraulic force, etc.

After a rotary force has been sufficiently transmitted, the current passed through the coil 4 is increased beyond the predetermined relief current to apply a sufficient pressure to the clutch assembly 16 to prevent clutch slipping operation. Under these conditions, since the feedback pressure within the second feedback chamber 43 is applied to the spool 39, although the pressure control precision is a little deteriorated, this pressure is sufficiently high not to cause the clutch to be slided. In this second embodiment, it is possible to obtain high output pressure by a solenoid current smaller than that of the prior art relief solenoid current.

Figure 2C:
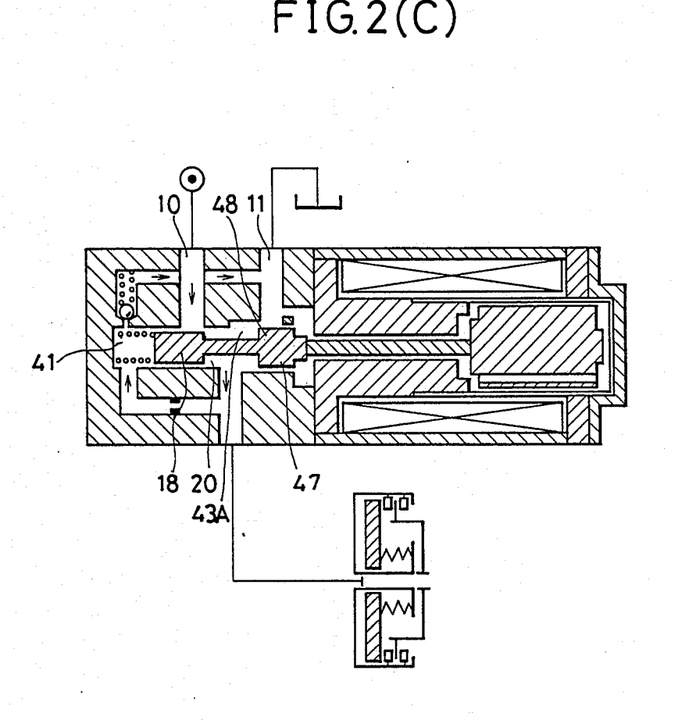
FIG. 2(C) is a cross-sectional view showing another modification of the second embodiment shown in FIG. 2(A)

FIG. 2(C) shows a modification of the second embodiment, in which the way of forming the feedback receiving area is different from that shown in FIG. 2(A).

In FIG. 2(C), the spool 47 is formed with a small diameter land portion 18 facing the supply port 10 and a large diameter land portion 48 facing the drain portion 48. In the same way as in the first embodiment, a first feedback chamber 41 is formed at the left end of the spool 47. Further, an area $A_2$ to which the second feedback pressure within the second feedback chamber 43A is applied is obtained by subtracting a pressure sensitive area of the land portion 18 on the groove side 20 from that of the land portion 47 on the groove side 20. Further, the expressions (4) and (5) explained in the second embodiment and the current-output pressure characteristics shown in FIG. 2(B) can be applied to these modifications as they are when the pressure receiving area in the first feedback chamber 41 is denoted by $A_1$ and that in the second feedback chamber 43A is denoted by $A_2$.

Figure 3A:
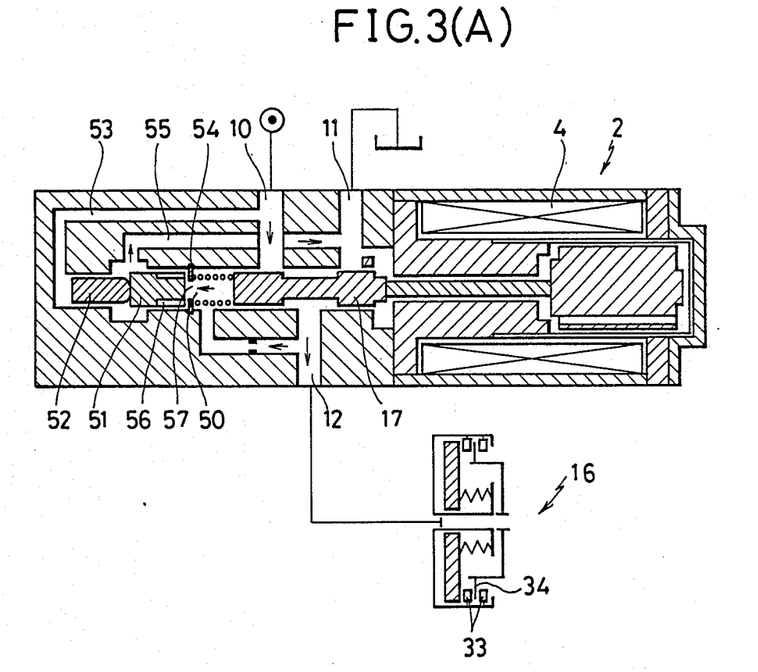
FIG. 3(A) is a cross-sectional view showing a third embodiment of the proportional pressure reducing valve of the present invention.

FIG. 3(A) shows a third embodiment, in which the same reference numerals have been retained for similar parts which have the same functions, without repeating the description thereof.

In FIG. 3(A), a piston 51 is slidably provided so as to face the spool 17 within a feedback chamber 50 formed on the left end of the spool 17. A plunger is additionally provided on the left side of the piston 51, and the left end of the plunger 52 communicates with the supply port 10 via the path 53. Therefore, this plunger 52 urges the piston 51 in the rightward direction, and further the piston 51 is urged against the stopper 54. The space at which the piston 51 is in contact with the plunger 52 communicates with the drain port 11 via the path 55. The piston 51 is formed with a groove portion 56 to form an open/close valve 57. The structural features and functional effects of this third embodiment other than those described above are substantially the same as in the first embodiment.

Figure 3B:
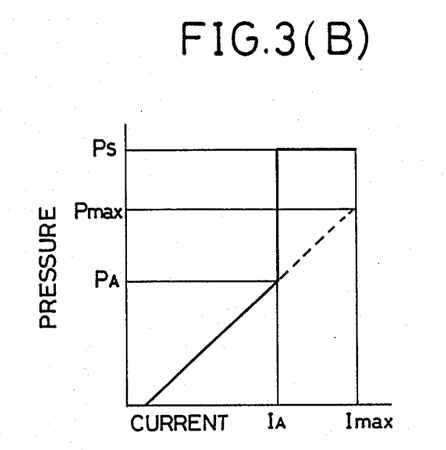
FIG. 3(B) is a graphical representation showing solenoid current-output pressure characteristics of the third embodiment shown in FIG. 3(A)

The operation of this third embodiment will be described hereinbelow. With reference to FIG. 3(B), when current supplied to the coil 4 is small and therefore the pressure at the output port 12 or the feedback chamber 50 is low, since the supply pressure is applied to the left end of the plunger 52, the piston 51 is brought into contact with the stopper 54. Under these conditions, since the groove 56 does not communicate with the path 55, the feedback chamber 50 is closed on the piston (51) side, so that the valve operates in the same way as in the prior-art valve.

When the pressure within the feedback chamber 50 or the output pressure increases as $$P \geqq P_A = P_S A_1/A_2 \quad (6)$$

where $A_1$ denotes a pressure receiving area of the 52; $A_2$ denotes a pressure receiving area of the piston 51; and $P_S$ denotes the supply pressure, the piston 51 moves in the leftward direction and the feedback chamber 50 communicates with the drain port 11 via the path 55. Since an axial force generated by the solenoid section 2 and applied to the spool 17 increases into unbalanced condition, the spool 17 moves in the leftward direction; the supply port 10 is full opened; and the output pressure P rises up to the supply pressure $P_S$.

In the same way as in the first embodiment shown in FIG. 1(A), the output pressure increases to $P_A$ when the current increases to $I_A$, so that the pressure applied to the clutch assembly 16 is controlled precisely under half clutch engagement condition between the two clutch discs 33 and 34 to gradually transmit a rotary force Thereafter, the supply pressure $P_S$ is obtained by increasing the current to a valve more than $I_A$, so that a sufficient engagement power can be obtained without producing clutch sliding operation.

Further, when current a little higher than $I_A$ is passed through the solenoid, since a high supply pressure $P_S$ can be applied to the clutch assembly 16, it is possible to economize power consumption as compared with the prior-art valve.

Figure 3C:
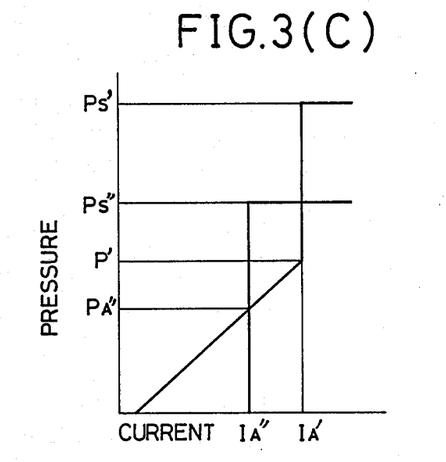
FIG. 3(C) is a similar graphical representation showing other solenoid current-output pressure characteristics of the third embodiment.

Further, as apparent from the expression (6), the output pressure $P_A$ changes in dependence upon the supply pressure $P_S$ in accordance with a proportional constant within a proportional control range. Therefore, it is possible to adjust the pressure valve $P_A'$ or $P_A''$ in relation to the supply pressure $P_S'$ or $P_S''$ as shown in FIG. 3(C).

Further, in this third embodiment, when it is not preferable to change the hydraulic pressure from $P_A$ to $P_S$ (supply pressure) abruptly, the change in pressure can be reduced by providing an additional throttle within the path 55. Further, when the piston 51 is formed with a plurality of groove portions (three or more), since air within the feedback chamber 50 can always be vented, it is possible to prevent unstable operation due to air floated in the feedback chamber 50.

A fourth embodiment of the present invention will be described with reference to FIG. 4(A), in which the same reference numerals have been retained for the similar parts which have the same functions, without repeating the description thereof.

Figure 4A:
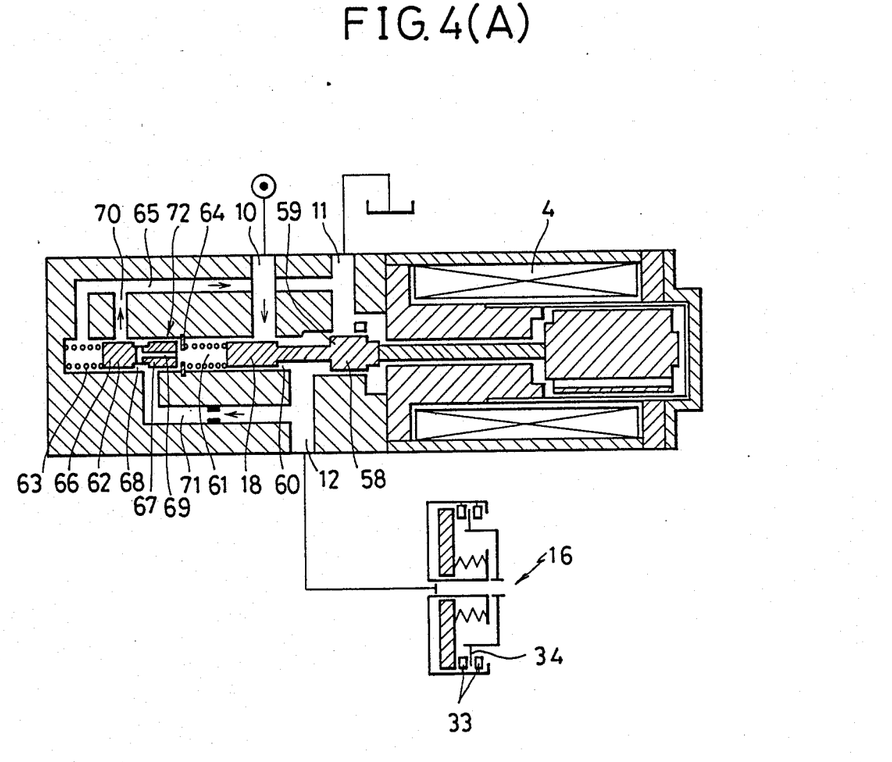
FIG. 4(A) is a cross-sectional view showing a fourth embodiment of the proportional pressure reducing valve of the present invention.

In FIG. 4(A), the spool 58 is formed with a land portion 18 facing the supply port 10 and a land portion 59 facing the drain port 11. The diameter of the land portion 59 is larger than that of the land portion 18 The second feedback pressure is applied to an area obtained by subtracting the pressure receiving area of the land portion 18 on the groove side 60 from that of the land portion 58 on the groove side 60.

A first feedback chamber 61 is formed on the left end of the spool 58. A second spool 62 is disposed within the first feedback chamber 61 coaxially with the spool 58. A spring 63 is disposed on the left end of this second spool 62 to urge the second spool 62 in the rightward direction into contact with the stopper 64. The left end of the second spool 62 communicates with the drain port 11 via the path 65. Further, the second spool 62 is formed with two land portions 66 and 67, and a groove portion 68 formed between the two land portions. A path 69 is formed passing through the land portion 67 and the groove portion 68.

Further, a path 70 communicating with the path 65 is formed so as to face the land portion 66 at the position where the second spool 62 is brought into contact with the stopper 64. Similarly, a feedback path 71 communicating with the output port 12 is formed so as to face the land portion 67 and the groove portion 68 at the same position.

As described above, the second spool 62, the spring 63, the path 70, and the feedback path 71 constitute a second pressure reducing valve to reduce the pressure within the first feedback chamber 61. The structural features and functional effects of this third embodiment other than those described above are the same as in the first embodiment.

The operation of the fourth embodiment will be described hereinbelow.

Figure 4B:
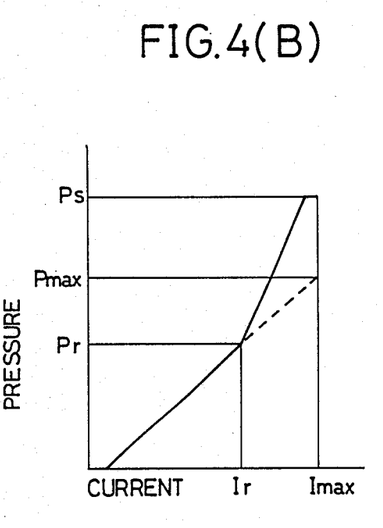
FIG. 4(B) is a graphical representation showing solenoid current-output pressure characteristics of the fourth embodiment shown in FIG. 4(A)

With reference to FIG. 4(B), when the pressure within the first feedback chamber 61 is equal to or lower than a preset relief pressure $P_r$ determined by an elastic force of a spring 63 which urges the second spool 62, since the second spool 62 is moved in the rightward direction into contact with the stopper 64, the first feedback chamber 61 communicates with the feedback path 71 via the path 69 formed in the second spool 62 (the path 69 does not communicate with the path 70). Therefore, the valve output pressure increases in proportion to the solenoid current, as in the prior art.

When the pressure in the first feedback chamber increases more than a predetermined relief pressure $P_r$ of the second pressure reducing valve 72, the second spool 62 moves in the leftward direction, so that the feedback path 71 is closed and the path 70 is opened so that the first feedback chamber 61 communicates with the drain port 11 via the paths 69 and 70

On the other hand, when the pressure within the first feedback chamber 61 drops below the relief pressure $P_r$ of the second pressure reducing valve 72, since the second spool 62 moves in the rightward direction, the pressure within the first feedback chamber 61 is maintained at the preset relief pressure $P_r$ as it is.

As shown in FIG. 4(B), although the gradient of the output pressure with respect to the solenoid current I passed through the coil 4 is small within the range where I is $I_r$ or lower, this gradient increases within the range where I is more than $I_r$. The pressure rises up to the supply pressure $P_S$ at the current lower than the maximum current $I_{max}$.

The pressure in the clutch assembly is controlled precisely under the pressure equal to or lower than $P_r$ in the same way as in the prior art, in such a way that the two clutch discs 33 and 34 are engaged under half clutch conditions to gradually transmit a rotary force between the two discs. In this embodiment, since the first and second feedback pressures are effective, the first spool 58 is held stably without being subjected to external disturbance such as friction, hydraulic pressure, etc.

Further, after a sufficient rotary force has been transmitted, the current passed through the coil 4 is increased beyond $I_r$, so that a high pressure is applied to the clutch assembly 16 to prevent clutch slipping operation. Under these conditions, since only the second feedback pressure is operative, although the clutch control precision is lowered, there exists no problem when a hydraulic pressure high enough to prevent clutch sliding operation is obtained. Further, since the supply pressure $P_S$ can be obtained by a current lower than $I_{max}$, it is possible to reduce the current consumption.

Further, in the above fourth embodiment, it is also possible to make the diameter of the land portion 18 equal to that of the land portion 59 of the first spool 58. In this case, since no second feedback pressure produced due to a difference in diameter between the two is produced and therefore only the first feedback pressure produced in the first feedback chamber 61 is operative, when the solenoid current increases beyond $I_r$ corresponding to the preset pressure pr determined by the second pressure reducing valve 72, the output pressure increases momentarily from $P_r$ to $P_S$, so that it is impossible to obtain an intermediate pressure.

A fifth embodiment of the present invention will be described hereinbelow.

As already described, although the clutch transmission power delay time is determined by delay of spool motion, pressure loss of the proportional pressure reducing valve, pressure loss of pipes, etc., since viscosity of the working oil increases at low temperature, the above delay time further increases. In practice, when the working oil viscosity increases at low temperature, since the hydraulic resistance at the throttle within the feedback path increases and the oil is closed within the feedback chamber, the spool cannot move smoothly. In addition, since the pressure loss in the pipe from the output port to the clutch assembly increases with increasing oil viscosity, the pressure applied to the clutch piston drops and therefore the piston movement becomes slow.

The viscosity of working oil increases exponentially with decreasing oil temperature. In the case of torque converter oil, the viscosity increases abruptly from −10° to −20° C. and changes to a thick malt syrup state below −30° to −40° C. Therefore, the clutch assembly will not operate smoothly when current is passed through the coil of the proportional solenoid section. Therefore, there exists a problem in that the delay time of the clutch response is as long as several seconds to several minutes, thus degrading the reliability of the valve.

To overcome this problem, there has been proposed a pressure reducing valve in which the damping throttle is adjusted according to oil temperature, as disclosed in Japanese Published Unexamined Utility Model Application No. 61-139369. However, even if only the damping effect of the spool valve is reduced, since the pressure loss of the pipe is still large, the response speed of the valve cannot be sufficiently improved.

This fifth embodiment provides a proportional pressure reducing valve which can improve the response speed of the feedback control valve at low temperature below −20° C.

Figure 5A:
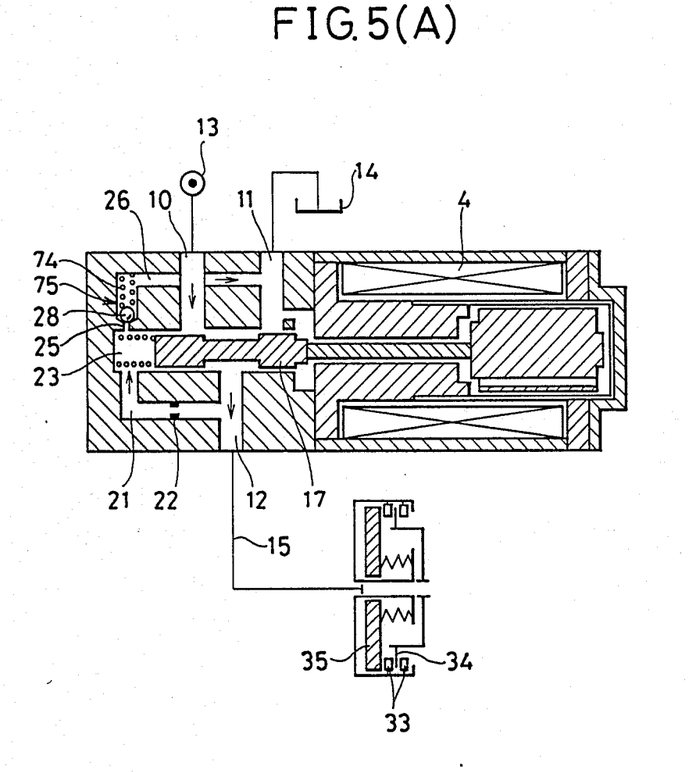
FIG. 5(A) is a cross-sectional view showing a fifth embodiment of the proportional pressure reducing valve of the present invention.

In FIG. 5A, a spring 74 made of shape memory alloy is used instead of the spring 27 of the relief valve 29 shown in the first embodiment That is, an open/close valve 75 is composed of this spring 74, the throttle 25 and the ball 28, which is closed at temperature above a transformation point of the shape memory alloy spring 74. The structural features and functional effects of this embodiment other than those described above is the same as in the first embodiment.

In FIG. 5A, when the hydraulic oil pressure rises beyond the transformation point of the spring 74 (e.g the normal temperature), the spring 74 extends to close the throttle 25, so that the open/close valve 75 is closed. Therefore, the proportional pressure reducing valve operates in the same way as in the prior-art valve as shown by a solid line A in FIG. 5B.

In contrast with this, when the hydraulic pressure temperature drops below the transformation point of the spring 74, the spring 74 contracts, so that the pressure within the feedback chamber 23 is relieved to the drain port 11. Under these conditions, the pressure within the feedback chamber 23 is determined at a ratio in pressure of the throttle 22 of the feedback path 21 to the throttle of the open/close valve 75. Therefore, when the solenoid current the same as passed at high temperature is passed through the coil 4, the output pressure at the output port 12 rises as shown by a solid line B in FIG. 5B, which indicates the output pressure higher than that A obtained at high temperature.

As long as the open/close valve 75 is closed at the normal temperature, the clutch pressure is controlled as in the prior-art valve. On the other hand, when the open/close valve 75 is opened at low temperature below the transformation temperature, since the hydraulic resistance of the throttle 22 of the feedback path 21 increases, the working oil displaced by the movement of the spool 17 is dischanged through the throttle 25. Therefore, it is possible to smoothly move the spool 17 to quickly open the supply port 10.

Further, when current the same as at high temperature is passed through the coil 4, since the pressure within the feedback chamber 23 is divided into two via the throttles 22 and 25, this pressure becomes low as compared with at high temperature. Therefore, since the spool 17 moves in the leftward direction, the opening rate of the supply port 10 becomes larger than at high temperature and therefore the pressure loss of the pressure reducing valve decreases. At the same time, since the pressure within the output port 12 at low temperature is higher than at high temperature, even if the pressure loss in the pipe 15 is large, it is possible to supply a sufficient oil pressure to the piston 35 of the clutch.

Further, the working oil warmed at the hydraulic pressure source 13 is circulated to the tank 14 by way of the supply port 10, the feedback path 21, the feedback chamber 23, the path 26 and the drain port 11, the temperature within the pressure reducing valve rises. Therefore, it is possible to markedly improve the response speed at low temperature due to combination of the above-mentioned various effects.

Figure 5B:
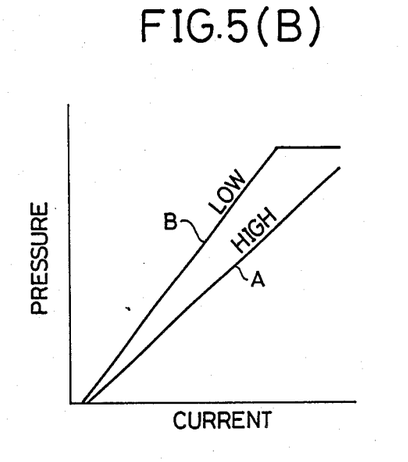
FIG. 5(B) is a graphical representation showing solenoid current-output pressure characteristics of the fifth embodiment shown in FIG. 5(A)

As depicted in FIG. 5B, a higher pressure can be generated by the same current at low temperature as compared with at high temperature. Therefore, a pressure higher than the pressure under which the two clutch discs 33 and 34 are kept under the half clutch engagement conditions is applied to the piston 35, so that there exists a tendency that the transmission shock is increased However, at low temperature since the movement speed of the piston is low and the viscosity of the working oil between the clutch disks 33 and 34 is also high, there exists a tendency that the transmission shock is reduced.

Here, it is preferable to set the transformation temperature of the shape memory alloy spring 74 at about −20° to −30° C. at which the oil viscosity is sufficiently high.

Figure 5C:
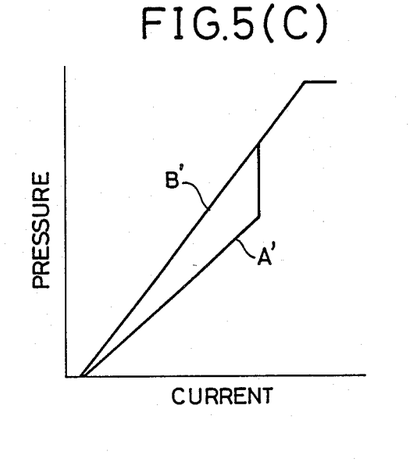
FIG. 5(C) is a similar graphical representation showing other solenoid current-output pressure characteristics of the fifth embodiment, in which spring load is set lower.

FIG. 5C shows solenoid current-output pressure characteristics obtained when an elastic force of the spring 74 is determined relatively small In this case, since the open/close valve 75 opens when the pressure within the feedback chamber 23 exceeds this spring force at high (the normal) temperature, the output pressure at high temperature as shown by a solid line A' rises momentarily to an output pressure obtained at the low temperature as shown by a solid line B' in FIG. 5C.

Figure 5D:
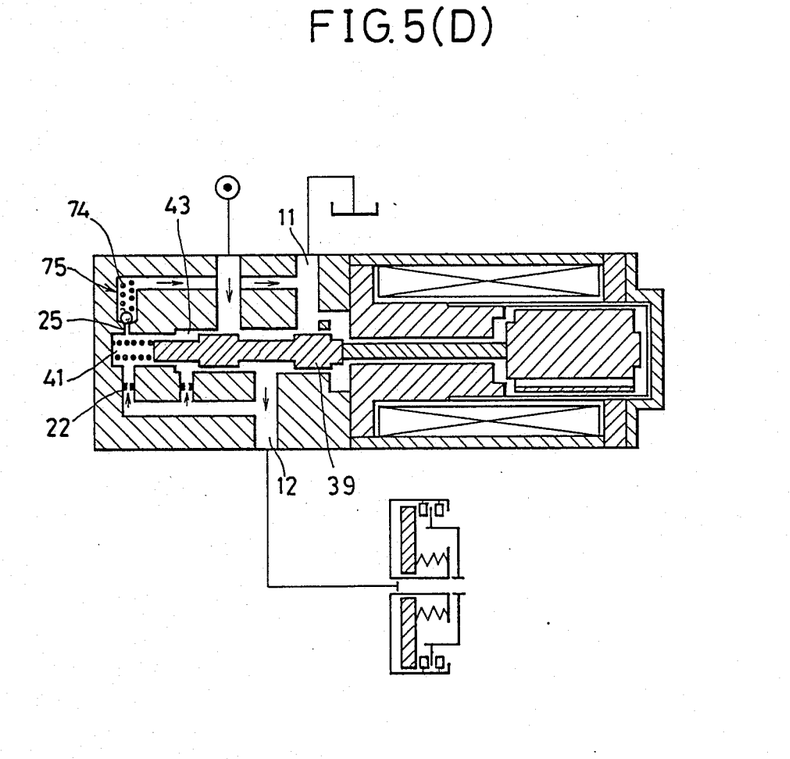
FIG. 5(D) is a cross-sectional view showing another modification of the fifth embodiment shown in FIG. 5(A).

FIG. 5D shows a modification of the fifth embodiment, in which a shape memory alloy spring 74 is used to construct the open/close valve 75, instead of the spring 27, in the second embodiment shown in FIG. 2A. The structural features and functional effects of this embodiment other than those described above are substantially the same as with the second embodiment previously described.

In the fifth embodiment shown in FIG. 5A, the gradient of the solenoid current-output pressure characteristics at low temperature is determined by a ratio in pressure of the throttle 22 to the throttle 25, this gradient changes according to oil temperature. In this modification, however, it is possible to make constant of this gradient irrespective of oil temperature That is, when the open/close valve 75 is closed at high temperature, the feedback pressure is generated within the first feedback chamber 41 and the second feedback chamber 43 so as to adjust the pressure.

When the open/close valve 75 opens at low temperature, since the hydraulic resistance of the throttle 25 is determined sufficiently small as compared with the resistance of the throttle 22, the pressure within the first feedback chamber 41 is roughly equal to the pressure at the drain port 11, so that the feedback pressure is obtained only within the second feedback chamber 43. Therefore, the pressure at the output port 12 is set to a point a little higher than at high temperature Further, the gradient of the output pressure with respect to the solenoid current is determined by the pressure receiving area of the spool 39 within the second feedback chamber 43.

Further, it is possible to obtain the same effect as described above by use of bimetal or wax expansion, in stead of the shape memory alloy spring, in order to form the open/close valve 75 actuated in response to oil temperature.

As described above, in the proportional pressure reducing valve including a spool housed in a valve housing in such a way that an axial force of a proportional solenoid is applied to one end thereof and an output pressure is feedbacked to the other end thereof via a throttle formed in a feedback chamber so as to be balanced, since the feedback chamber communicates with a tank via a control valve after output port pressure increases gradually to a relief pressure, it is possible to increase the output pressure momentarily up to the supply pressure. That is, it is possible to improve the control precision, widen control pressure range, and increase response speed, without increasing the size of the proportional solenoid and the current passed therethrough, when applied to the clutch assembly. The valve output pressure below the relief pressure is used to engage the clutch in a half clutch condition and the valve output pressure the same as the supply pressure is used to engage the clutch in a tight clutch condition, after a sufficient torque has been transmitted.

What is claimed is:

1. A proportional pressure reducing valve comprising:
   (a) a valve housing formed with a supply port, an output port, a drain port, and a first feedback chamber communicating with the output port;
   (b) a proportional solenoid attached to said valve housing; connected to said
   (c) a spool having a first end solenoid and a second end exposed to the feedback chamber, said spool formed with a groove for allowing the supply port to communicate with the output port, when said spool is driven by said proportional solenoid in such a way that output pressure at the output port increases in proportion to current passed through said solenoid under balanced conditions of an axial force applied to the first end of said spool by said proportional solenoid and a feedback force applied to the second end of said spool within the feedback chamber; and chamber to
   (d) valve means for allowing the feedback communicate with the drain port to control said spool into inbalanced condition, when output pressure at the output port exceeds a predetermined value, to sharply raise output port pressure.

2. The proportional pressure reducing valve of claim 1 wherein said valve means is a relief valve including a valve ball and a spring for relieving hydraulic pressure within the feedback chamber to the drain port, when output port pressure rises beyond a predetermined relief pressure, to momentarily raise output port pressure to supply pressure.

3. The proportional pressure reducing valve of claim 1, wherein said valve housing is further formed with a second feedback chamber communicating with the output port; said spool is formed with a shoulder portion facing the second feedback chamber; and said valve means is a relief valve including a valve ball and a spring for relieving hydraulic pressure within the first feedback chamber to the drain port, when output port pressure rises beyond a predetermined relief pressure, to sharply raise the output port pressure up to the supply port pressure in proportion to current passed through said solenoid.

4. The proportional pressure reducing valve of claim 1, wherein said valve means is an open/close valve including valve piston for relieving hydraulic pressure within the feedback chamber to the drain port, when output port pressure rises beyond a predetermined relief pressure, to momentarily raise output port pressure to supply pressure.

5. The proportional pressure reducing valve of claim 1, wherein said valve means is a pressure reduction valve including a second spool formed with a path, for relieving hydraulic pressure within the feedback chamber to the drain port, when output port pressure rises beyond a predetermined relief pressure, to sharply increase the output port pressure up to the supply pressure in proportion to the current passed through the solenoid.

6. The proportional pressure reducing valve of claim 1, wherein said valve means is a temperature sensitive relief valve for relieving hydraulic pressure within the feedback chamber to the drain port when hydraulic oil temperature drops below a predetermined low temperature.

7. The proportional pressure reducing valve of claim 6, wherein the predetermined low temperature is about $-20°$ to $-30°$ C.

8. The proportional pressure reducing valve of claim 6, wherein the temperature relief valve is a relief valve made of shape memory alloy.

9. A proportional pressure reducing valve comprising:
   (a) a valve housing formed with a supply port, an output port, a drain port, and a first feedback chamber and a second feedback chamber both communicating with the output port;
   (b) a proportional solenoid attached to said valve housing;
   (c) a spool having a first end connected to said solenoid, a second end exposed to the first feedback chamber and a shoulder portion facing the second feedback chamber, said spool formed with a groove for allowing the supply port to communicate with the output port, when said spool is driven by said proportional solenoid in such a way that output pressure at the output port increases in proportion to current passed through said solenoid under balanced conditions of an axial force applied to the first end of said spool by said proportional solenoid and a feedback force applied to the second end of said spool within the first feedback chamber and the shoulder portion within the second feedback chamber; and
   (d) a relief valve including a valve ball and a spring for relieving hydraulic pressure within the first feedback chamber to the drain port, when output port pressure rises beyond a predetermined relief pressure, to sharply raise the output port pressure up to the supply port pressure in proportion to the current passed through said solenoid.

* * * * *